Sept. 12, 1967    R. E. O'BRIEN ETAL    3,340,574
UNIVERSAL FORMING PRESS

Filed July 22, 1965    13 Sheets-Sheet 1

INVENTOR.
ROBERT E. O'BRIEN
DIETRICH K. ROTH
BY
ATTORNEYS

INVENTOR.
ROBERT E. O'BRIEN
DIETRICH K. ROTH
BY
ATTORNEYS

INVENTORS
ROBERT E. O'BRIEN
DIETRICH K. ROTH

ATTORNEYS

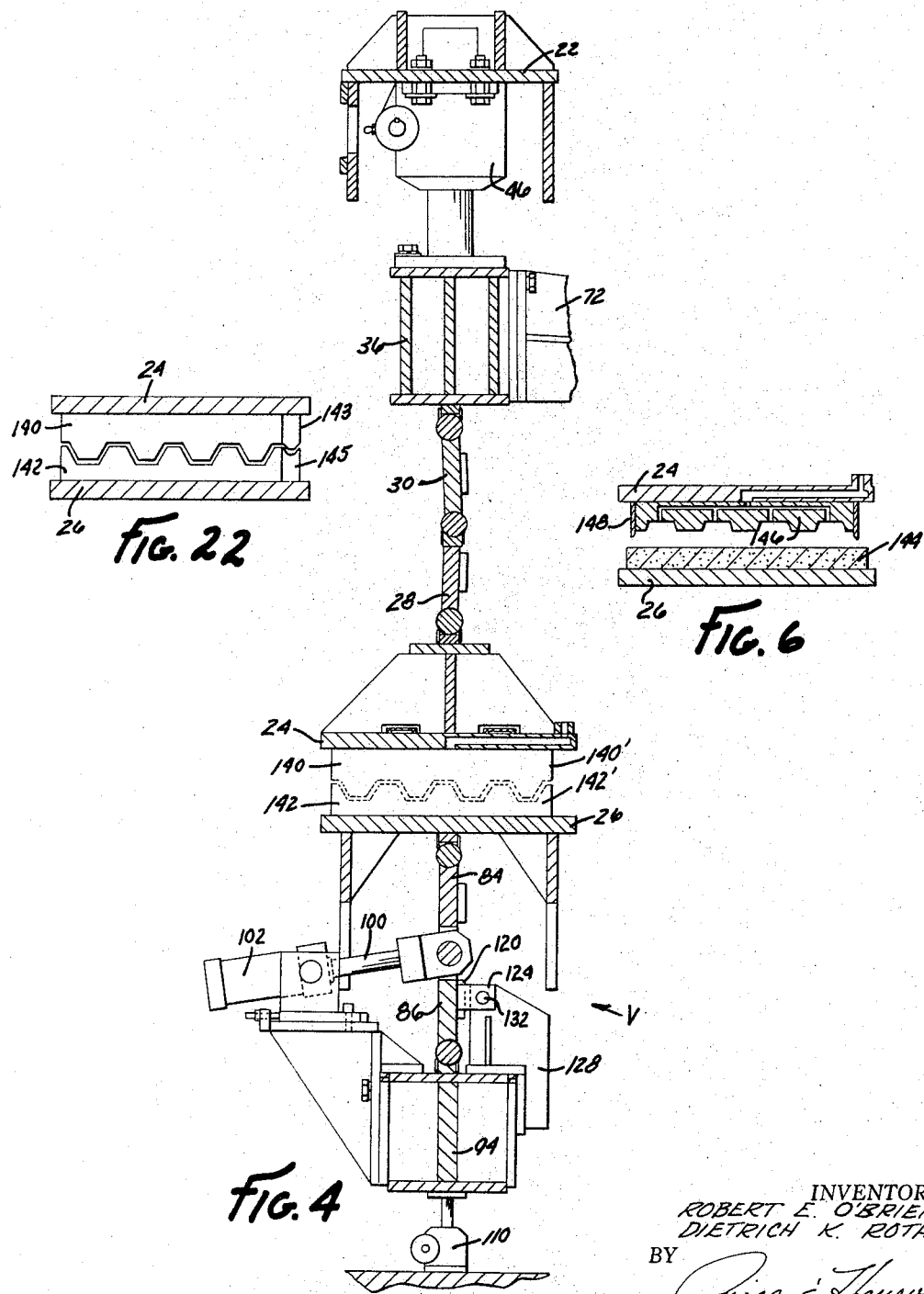

Sept. 12, 1967  R. E. O'BRIEN ET AL  3,340,574
UNIVERSAL FORMING PRESS
Filed July 22, 1965  13 Sheets-Sheet 7

INVENTORS
ROBERT E. O'BRIEN
DIETRICH K. ROTH
BY
ATTORNEYS

INVENTORS
ROBERT E. O'BRIEN
DIETRICH K. ROTH
BY
ATTORNEYS

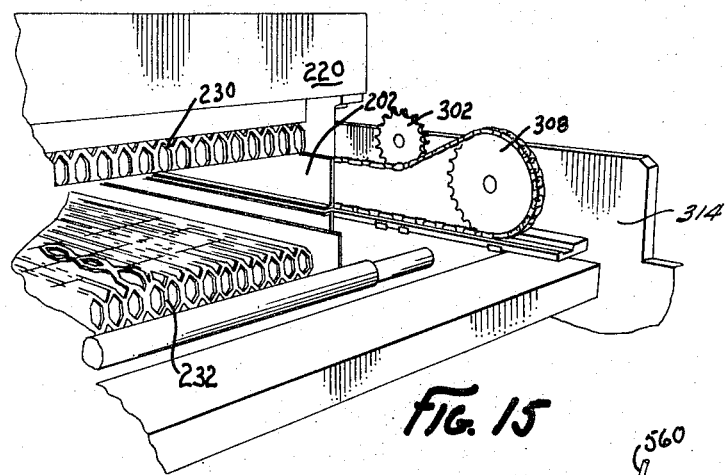
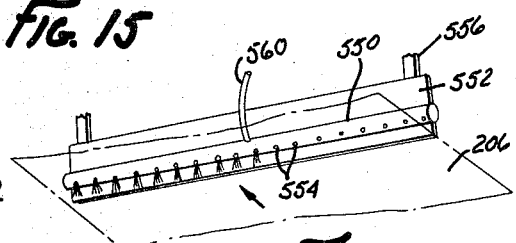
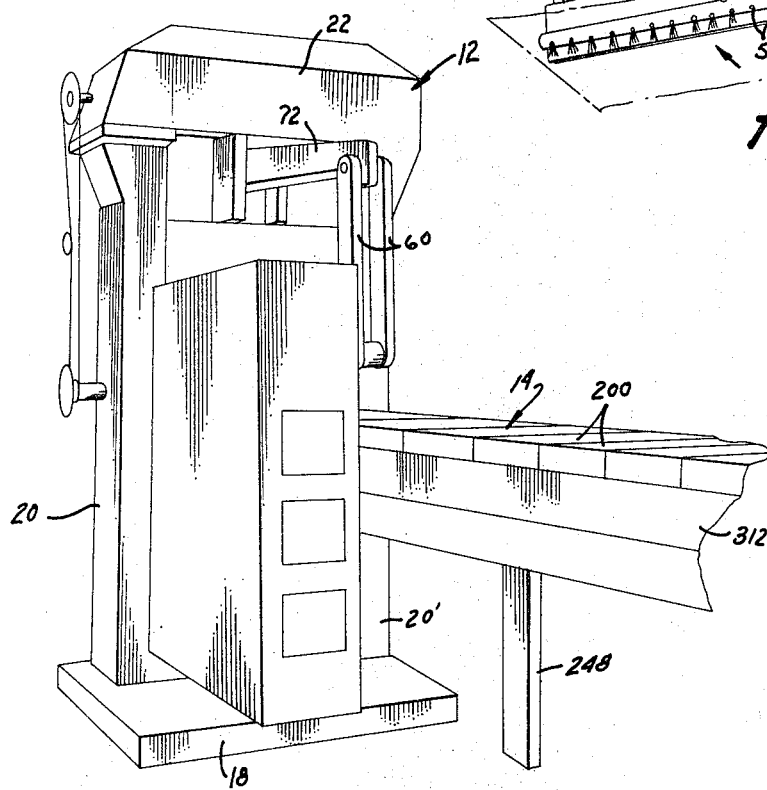
INVENTORS
ROBERT E. O'BRIEN
DIETRICH K. ROTH
BY
ATTORNEYS

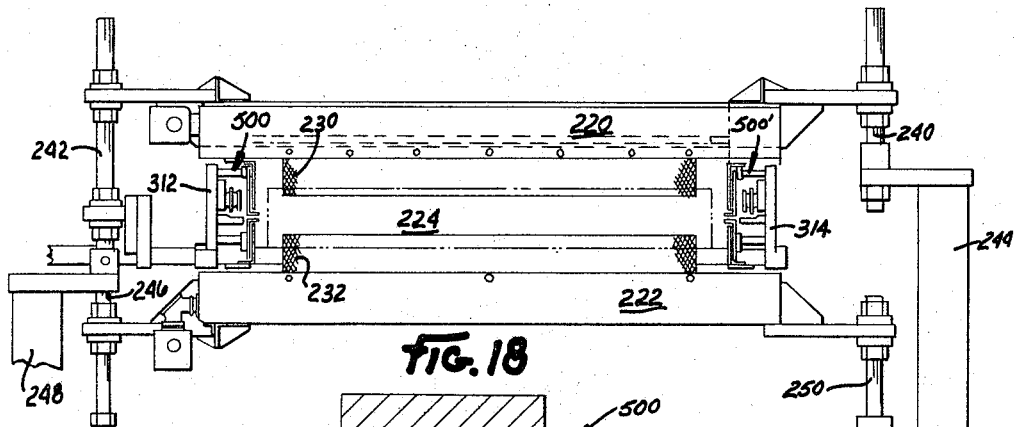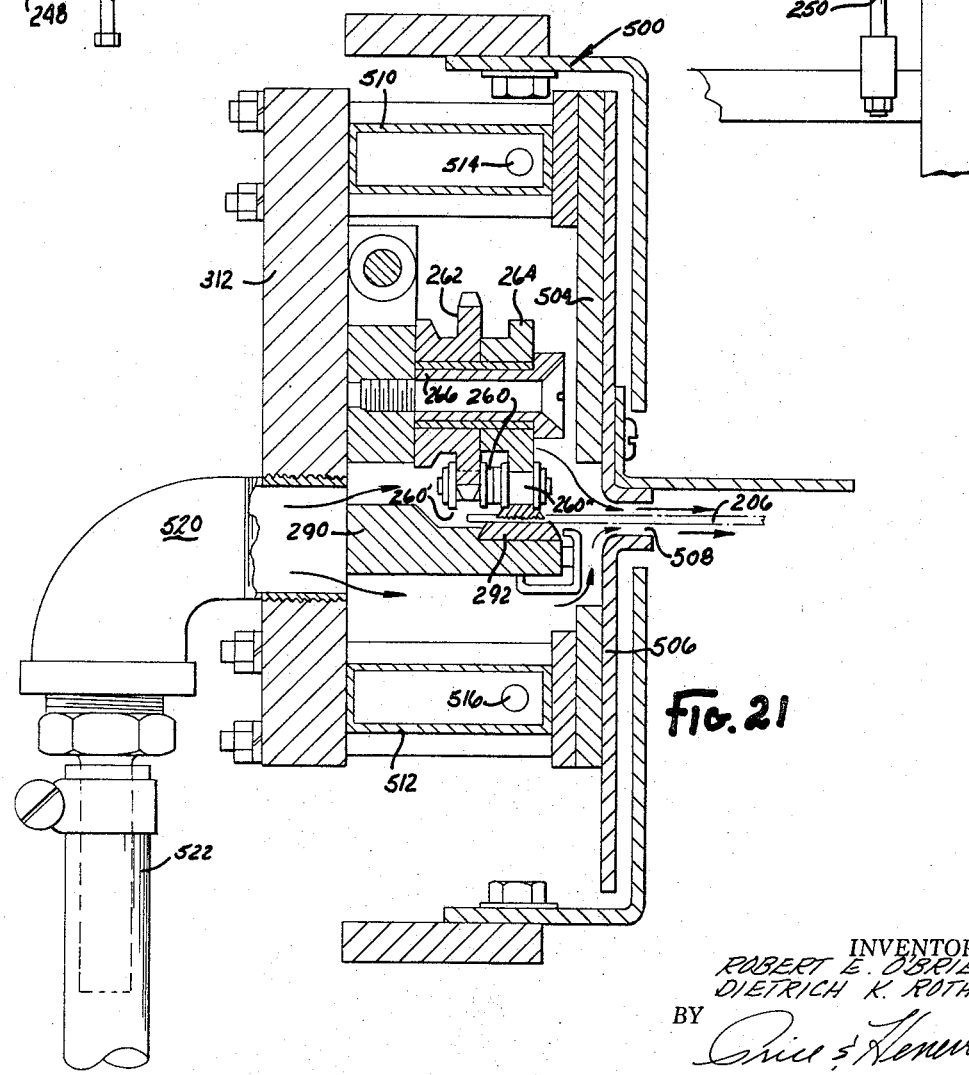

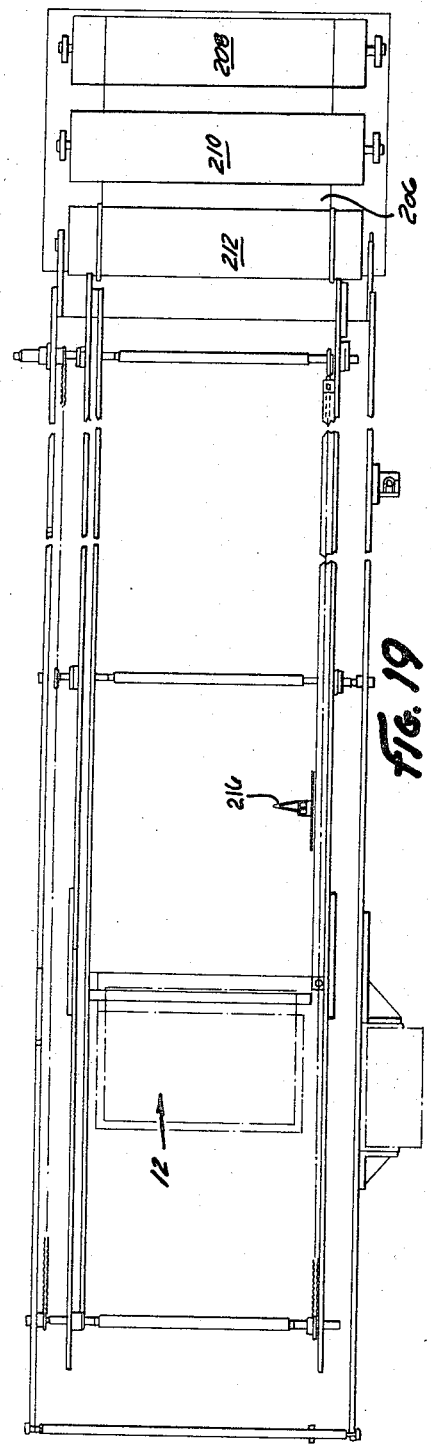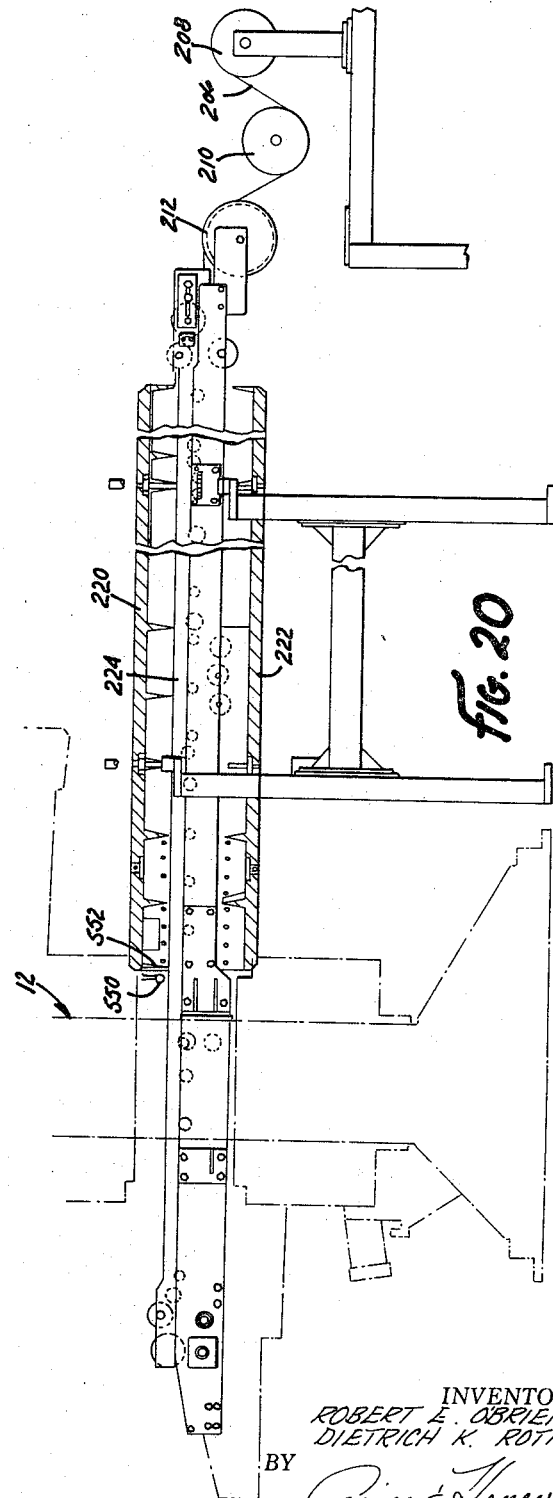

Sept. 12, 1967  R. E. O'BRIEN ET AL  3,340,574
UNIVERSAL FORMING PRESS
Filed July 22, 1965  13 Sheets-Sheet 13
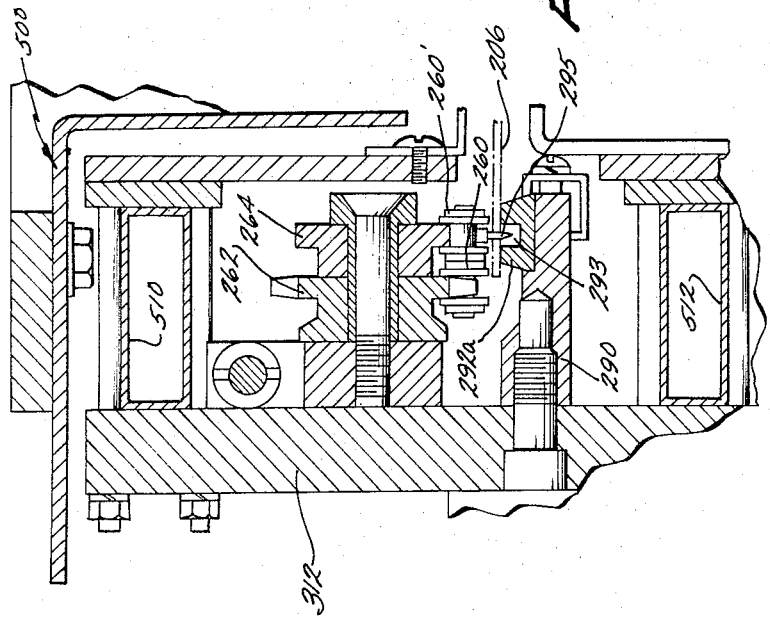
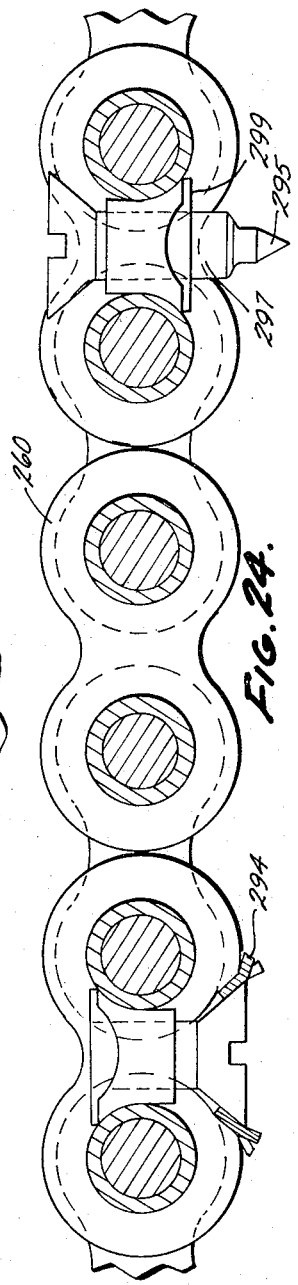
INVENTORS
ROBERT E. O'BRIEN
DIETRICH K. ROTH
BY
*Price & Heneveld*
ATTORNEYS

United States Patent Office 3,340,574
Patented Sept. 12, 1967

3,340,574
UNIVERSAL FORMING PRESS
Robert E. O'Brien and Dietrich K. Roth, Grand Rapids, Mich., assignors to Kirkhof Manufacturing Corporation, Grand Rapids, Mich., a corporation of Michigan
Filed July 22, 1965, Ser. No. 474,132
4 Claims. (Cl. 18—16)

This invention relates to equipment for forming articles from plastic web stock, and particularly relates to a press capable of performing several different alternate types of forming operations on polymeric sheet stock.

Several different types of forming operations using heat and pressure are presently done on generally continuous web plastic, to form three-dimensional objects. One type of operation is by pneumatic pressure differential forming, using a peripheral sealing blade, followed by a peripheral creasing of the web around the formed articles with the blade, while still in the press, to enable the articles to be subsequently peeled out of the web. This may be done by the equipment taught and claimed in United States Patent No. 3,166,790, for example.

Another type of forming press equipment employs matching dies which shift together to physically force a heated portion of the web into three-dimensional object.

Still a third type of equipment employs a combination of physical and pressure differential forming. This is otherwise often known as plug assist pressure differential forming.

Each of these particular methods of forming requires particular characteristics, and is frequently used on a different type of material than the others. The equipment for each, therefore, requires different operating characteristics, to handle the different materials, and to suit the dies and/or pressure differential operations performed.

More specifically, pressure differential forming methods, when using a blade for sealing and creasing the plastic, operates well on very thin sheet material. In order to perform effectively, the positions of the knife edge of this equipment on the material, with respect to the platens, is crucial. This is particularly true with respect to the position of the platen opposite the blade (usually the lower platen). Also, this lower platen must be capable of withstanding a substantial impact force from the upper platen blade, without moving any significant amount under the force, since any movement would prevent proper sealing and/or creasing.

Matching die press equipment, on the other hand, very useful for example for preheated foam type sheet material or the like, necessitates a very substantial platen movement in a short time period, as does deep draw, plug assist pressure differential forming equipment. This necessitates movement of both platens, to obtain the movement without sacrificing stability or forming time.

Since these different types of forming operations require equipment with different operating characteristics, article manufacturers, especially container manufacturers, regularly employ an entire series of different expensive machines, each having special forming characteristics for the type of forming operation involved. Because each such machine regularly costs tens of thousands of dollars, the capital investment required is extremely large. This is a special handicap for small manufacturers who may not have sufficient orders to keep all units busy to warrant capital expenditure for all types of forming equipment.

It is an object of this invention to provide a forming press capable of enabling different types of forming operations to be effectively and efficiently performed on the same basic equipment. The press may be used for plug assist, pressure differential forming with blade type sealing and scoring techniques, or for matched die forming techniques, or for interrelated techniques.

Another object of this invention is to provide unique, versatile apparatus that is capable of very substantial and rapid platen movement of both platens for some types of forming operations, and also is capable of exactly controlled platen positioning and movement for other types of operations.

Another object is to provide a universal forming press wherein the lower platen may be shiftable simultaneously with the upper platen, or alternatively, or successively, and further, wherein the lower platen may be rigidly fixed in one preset position to have a porticularly accurate operative location with respect to the upper platen, to enable even thin sheet material to be formed by blade sealing and creasing techniques.

Another object of this invention is to provide a universal forming press that can be changed from one type of forming operation to another very simply, merely by insertion of a lock element, and pushing a control switch. The lower platen is shiftable through a substantial throw distance in one condition, and completely fixed in exact location in another condition.

Still a further object of this invention is to provide a versatile forming press enabling operation to another, using the same equipment, merely by changing dies, locking or unlocking the one platen, and changing the controls to operate both platens or one, as needed.

These and several other objects of this invention will become apparent upon studying the following specification in conjunction with the drawings in which:

FIG. 4 is a sectional view taken through the center of the press apparatus;

FIG. 6 is a fragmentary, sectional, elevational view of an alternate set of pressure differential forming die inserts for the matching die elements shown as part of the apparatus in FIG. 4;

FIG. 15 is a fragmentary, perspective view of the entrance for the web into the preheat oven in FIG. 1 and FIG. 16;

FIG. 16 is a perspective view of the preheat oven and press in FIG. 1, taken from the direction XVI in FIG. 1;

FIG. 17 is a fragmentary perspective view of the underside of baffling and zone cooling means at the juncture between the press and the preheat oven;

FIG. 18 is an end elevational view of the entrance to the preheat oven;

FIG. 19 is a plan view of the web handling apparatus in this assembly;

FIG. 20 is a side elevational, sectional view of the preheat oven and web handling apparatus in this assembly, showing the press in phantom;

FIG. 21 is an enlarged, sectional view of one of the two like cooling tunnels along opposite sides of the preheat oven, both being shown on much smaller scale in FIG. 18, and the web advancing means associated therewith;

FIG. 22 is a side elevational view of the dies in FIG. 4 showing an alternate web control means to that in FIG. 17;

FIG. 23 is a fragmentary, sectional elevational view of a modified form of web advancing means within one cooling tunnel, and modified from the one shown in FIG. 21; and FIG. 24 is a greatly enlarged fragmentary view of the modified advancing chain used in the subassembly in FIG. 23, and modified from the one shown in FIG. 11.

Figure 1:
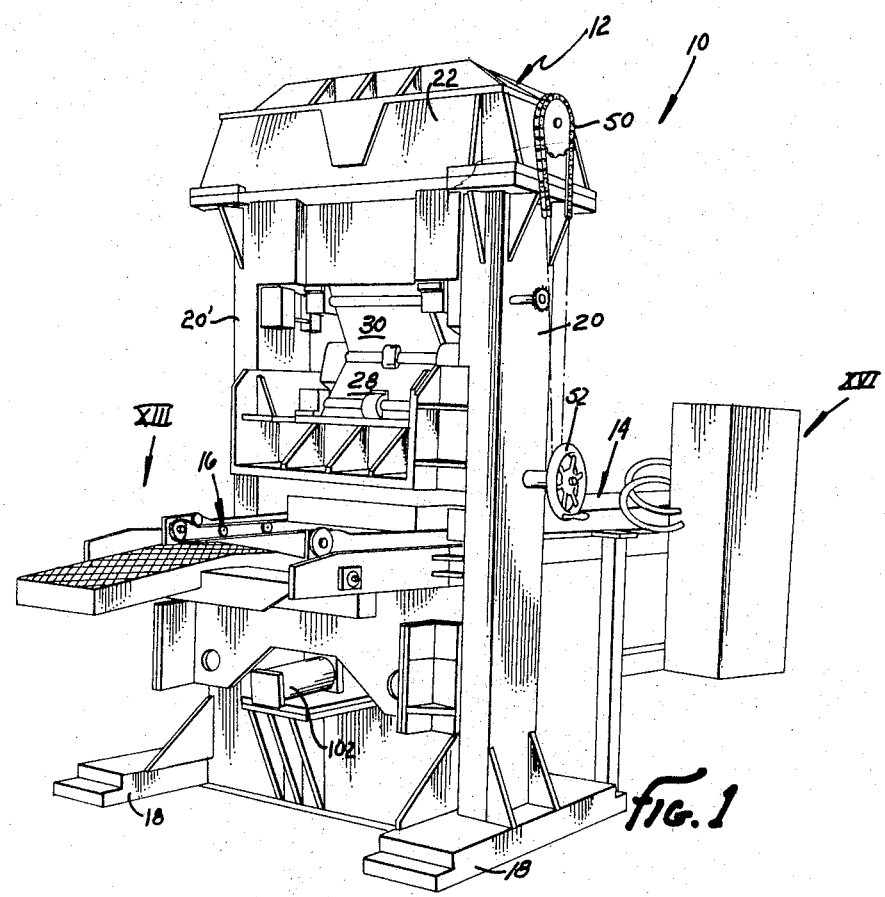
FIG. 1 is a perspective view of the apparatus, viewing the discharge end of the forming press apparatus and cooperative preheat oven equipment.
Figure 5:
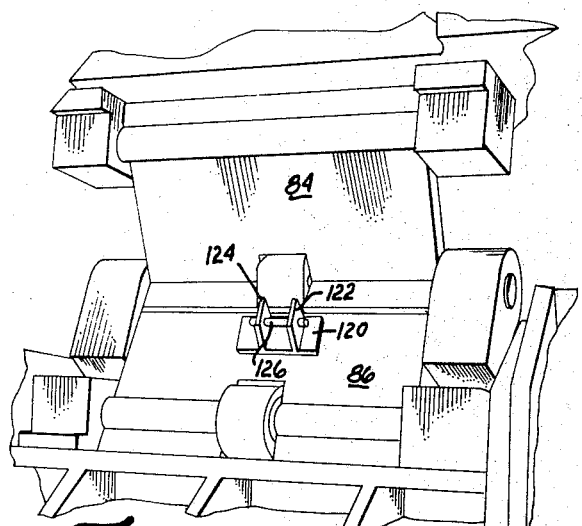
FIG. 5 is an enlarged, fragmentary, perspective view of the lower platen toggle linkage of the press, taken generally from the direction of arrow V in FIG. 4.

Referring now specifically to the drawings, the complete web handling and forming apparatus 10 includes a forming press assembly 12, a preheating oven assembly 14 leading into the forming press, and a web gripping and advancing means 16 which extends through the entire oven and through the press to discharge the web matrix and formed articles on the opposite side of the press from the oven.

FORMING PRESS ASSEMBLY

The press 12 includes a basic frame structure which includes a base support footing 18, a pair of spaced, parallel, upright pillars 20 and 20' extending upwardly from the footing and interconnected at the upper end by a rigid cross beam 22.

The sheet or web advancing means 16 extends generally horizontally through the central portion of the press, in the space between pillars 20 and 20'. Above this advancing means is upper platen support and control means, and below it is lower platen support and control means.

More specifically, the upper platen 24 is spaced closely adjacent the lower platen 26 therebeneath (FIG. 2), while being suspended from the upper cross beam 22 by controlled positioning means. The upper platen is suspended on a toggle linkage which includes a lower plate-type link 28 pivotally connected at its upper end to an upper plate-type link 30. The lower link is pivotally connected on horizontal shaft 32 to the upper platen. The upper link is connected on a horizontal pivot shaft 34 to a carriage 36. This carriage adjustably suspends the upper platen. The lateral ends of upper platen 24 are vertically slidably engaged with guide slide bearings 38 and 38', with 38' being partially cut-away in FIG. 2 to show the structure. These slide bearings are mounted on support pillars 20 and 20'. Bending of the toggle linkage therefore causes upper platen rising, and straightening of the upper toggle linkage causes upper platen lowering.

Also, the initial operating position of the upper platen can be controlled by adjusting carriage 36 up and down on its slide bearings 42 and 42', using a pair of screw jacks 44 and 46, both operated through a shaft 48 by a chain and sprocket mechanism 50. The chain and sprocket mechanism is operated by a hand crank 52.

The upper toggle linkage is actuated by hydraulic cylinder means 56 (FIG. 3) which extends from pivot shaft 58 (FIG. 2) between the two links of the toggle, and link 60 (FIG. 3) of a stabilizer linkage. Fluid cylinder means 56 has a piggyback end-to-end double cylinder assembly with the back ends of first cylinder 62 and second cylinder 64 fixed together. The rod 66 of cylinder 62 extends to collar 68 that fits around shaft portion 58. The second cylinder 64 has its rod 70 extending in the opposite direction to a pivotal connection in the center of link 60. This link 60 is mounted pivotally on its upper end to a rigid cantilever beam 72 mounted to the slide 36. The lower end of link 60 is pivotally connected to a rod 74 that extends back to a pivotal connection on the lower shaft 32 of the toggle linkage to the upper platen. This linkage absorbs the horizontal component of the thrust exerted by lower plate-type link 28 against shaft 32, thus stabilizing the upper platen by allowing only the vertical component of the thrust of link 28 to act upon it. Extension of the first cylinder 62 causes the toggle linkage to almost straighten, but not quite to a coplanar position of the links. Extension of the second cylinder 64 causes final shifting of the toggle linkage to its extended upright position with the links coplanar, for the last portion of the upper platen stroke.

Figure 3:
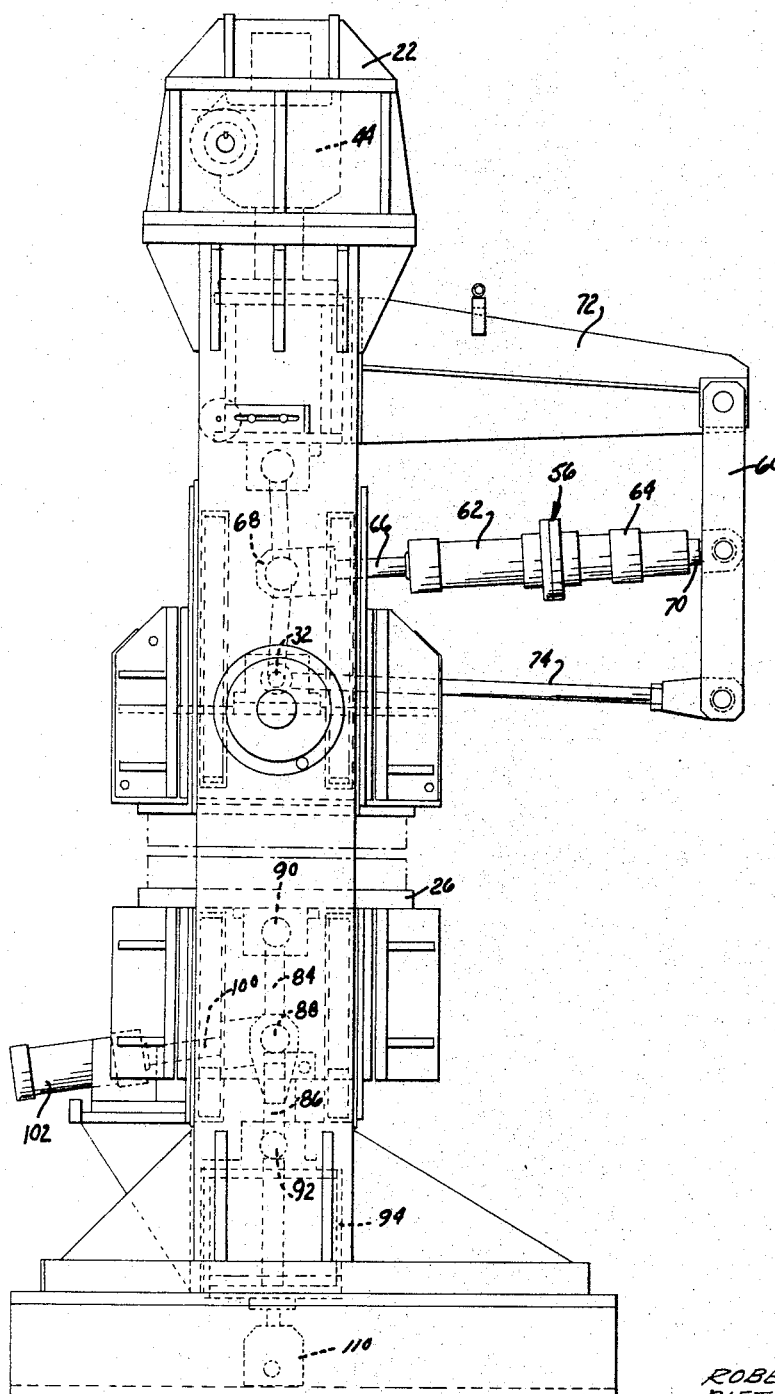
FIG. 3 is a side elevational view of the right side of the press apparatus as shown in FIG. 1.

The lower platen construction is special, especially when combined with this upper platen assembly. More specifically, lower platen 26 is also mounted with its lateral ends in sliding contact with slide bearing means 80 and 80' on columns 20 and 20' so that it can be vertically adjusted. It has a toggle linkage which includes an upper toggle plate 84 and a lower toggle plate 86 linked together on a horizontal transverse pivot axis 88. The upper end of link 84 is also pivotally connected on a parallel shaft 90 to lower platen 26 (FIG. 3). The lower link 86 is pivotally connected on a parallel shaft 92 to a lower platen carriage 94. The ends of these shafts are supported in journals for smooth action in their parallel relationship. Connected on a bearing to the center of shaft 88 is a collar 98 that is mounted to the end of rod 100 of fluid cylinder 102 (FIGS. 1, 3, and 4). This fluid cylinder is pivotally mounted to the press to enable the lower platen linkage to be extended or folded.

Lower platen carriage 94 is adjustably mounted within slide bearings 106 and 106' for slight vertical movement by means of jacks 108 and 110 operated through a common shaft 112 by a hand crank 114 or the equivalent. Adjustment of these upper and lower carriages is for initial positioning of the apparatus to suit a particular set of dies, thickness of webbing, or other like factors.

The lower platen, as well as the upper platen, can therefore be raised or lowered by extending and contracting its actuating cylinder to extend and fold its toggle linkage. It also can be anchored or locked in a rigid, stable, pre-selected fixed condition, with the lower platen at its upper position. More specifically, referring to FIGS. 2, 3, 4 and 5, there is affixed to lower toggle plate 86 an anchoring or locking yoke. It includes a plate 120 and a pair of laterally extending spaced parallel plates 122 and 124 having aligned openings 126. These plates are adapted and positioned to straddle a rigid anchor plate 128 (FIG. 2 and FIG. 4) when the lower toggle linkage is fully extended as shown in FIG. 4.

Figure 2:
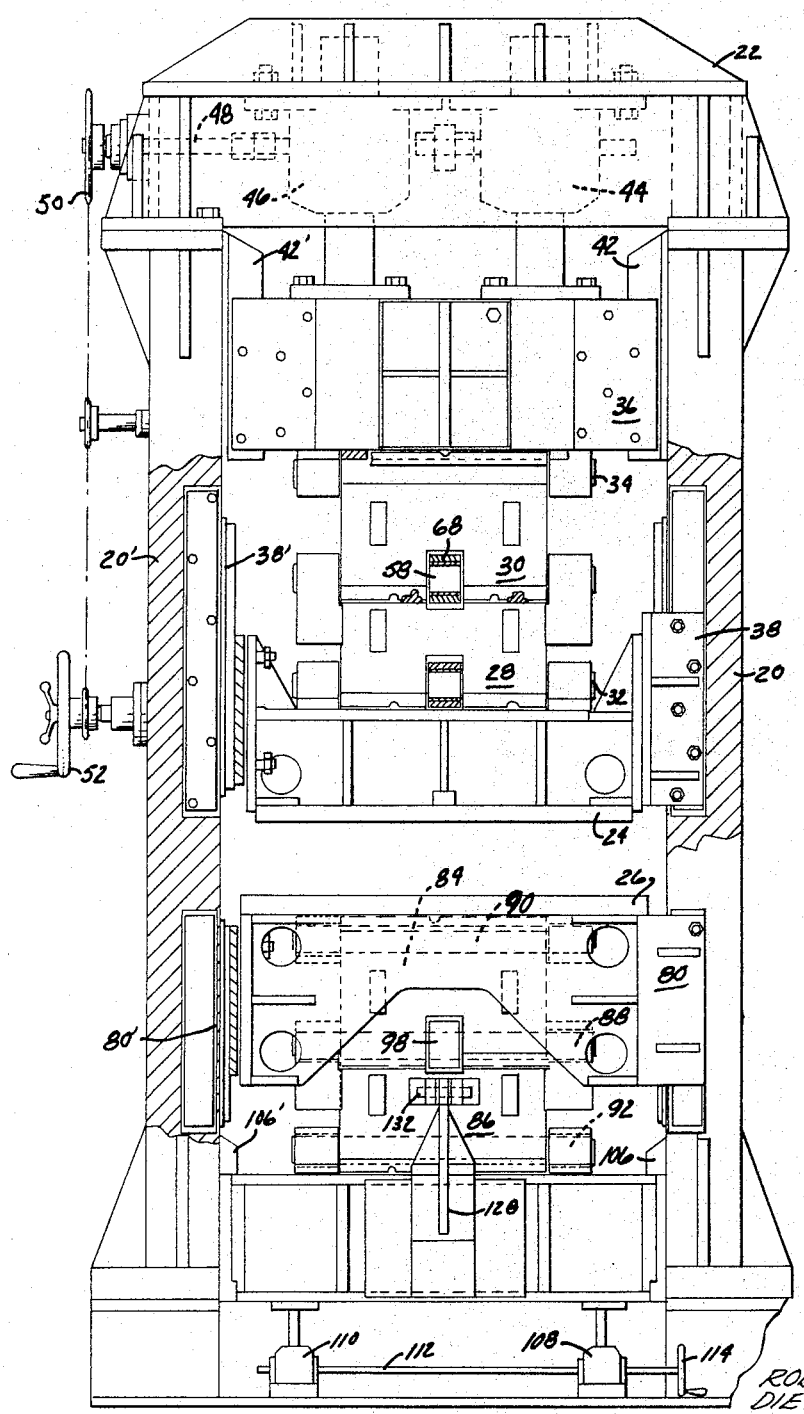
FIG. 2 is an elevational view, partially sectioned, of the infeed side of the press apparatus in FIG. 1.

When the lower toggle linkage is extended, with lower platen 26 in its uppermost position, it can be locked in this position by inserting a cross pin or anchor pin 132 through openings 126 in the yoke, and a corresponding opening in anchor plate 128 in the manner shown in FIG. 2. It will be noted that the orifices in these interlocking components align when the lower toggle linkage is directly upright in its vertically colinear position. In this position, any thrust imparted to the lower platen by the upper platen is actually imparted directly through the bearings and journals, the lower toggle links being in direct compression, rather than tending to cause folding of the toggle linkage. The stresses are directly applied to the toggle linkage, with only minor stress being applied to the pin connection 132. The anchor plate 128 is attached fixedly to carriage 94 supporting the lower platen assembly, to be vertically adjusted with carriage 94, but to be specifically fixedly located in a particular position of the carriage.

The dual alternate function of this lower platen enables several different selected types of operations to be performed on the same press. More specifically, since both the upper platen and the lower platen have a substantial stroke, matching dies like those shown in phantom at 140 and 142 in FIG. 4 can be employed on materials to be physically deformed into three-dimensional articles. It can achieve high speed operation due to movement of both of the platens. These platens can be programmed, in a manner to be explained hereinafter, to operate simultaneously toward and away from each other, or to operate substantially, either with the upper platen moving first or the lower platen moving first, in controlled delayed fashion.

Also, since the lower platen can be locked in its elevated position, with resulting stability and inconsequential shifting of the lower platen under thrust, a set of pressure differential forming dies with a blade sealer and creaser like that shown in FIG. 6 can be employed. More specifically, a heated, porous, rigid surface element 144 is mounted to the lower platen 26, and a female pressure differential forming die 146 is mounted to the upper platen, the female die including a sealing and creasing knife edge 148 around its periphery. Attachment of the dies can be by bolts, clamping brackets or any other expedient commonly used. The apparatus can be used even on extremely thin thermoplastic sheet material, using this knife element, yet with complete control of platen movement to thousandths of an inch. The blade, therefore, will exactly seal without creasing significantly, then will crease without complete severing so that the articles stay in the web to be transferred out of the press. This is possible because the lower platen is locked in an accurate relationship so that even the knife edge lowers controlled amounts with respect to the cooperative surface 144 on the lower platen. The double piggyback cylinder arrangement 62 and 64 shown in FIG. 3 is used to advantage by extending cylinder 62, for example, until the knife edge seals against the thin plastic sheet, then forming by pressure differential techniques, and then extending the second piggyback cylinder 64 to cause the knife to crease the plastic so that when the web is drawn out of the press and cooled, the article can be broken out of the web matrix.

By unlocking the lower platen, and reciprocating both platens toward and away from each other, matching dies like those at 140 and 142 in FIG. 4 can be employed to advantage on the web stock. Normally, the stock on which such dies are used is of heavier construction, and frequently requires preheating prior to entry into the press. This is in contrast to the pressure differential dies in FIG. 6 where element 144 is usually heated to warm up the thin plastic web sufficiently to form it.

To achieve preheating, a preheat oven is used in combination with the press. To handle some materials, particularly foam type web stock, the oven and the web advancing means through the oven and press should have particular features like those described below.

PREHEATING OVEN ASSEMBLY

The oven assembly 14 extends a considerable distance in back of the forming press into which it feeds, as shown in FIGS. 1, 16, 19 and 20 for example. This oven apparatus 14 has a plurality of side-by-side heating units 200 juxtaposed horizontally. Heat is applied both upwardly and downwardly toward a central tunnel area in and through the oven. This oven has a web entrance 202 (FIG. 15) at its end furthest from press assembly 12. The oven is slightly wider than the width of the web 206 (FIG. 20) to be heated. The web is unwound from a spool 208 and passed over suitable guide rollers 210 and 212 into the oven entrance. The oven may actually contain a plurality of different temperature sections, each employing a separate temperature controller, including a sensor such as the one illustrative temperature sensor thermocouple 216 (FIG. 19). Three separate responsive controls are described in FIGS. 7A, 7B, and 7C hereinafter, to show control of three separate sections of the oven. In the particular oven illustrated in the circuit diagrams, the three separate heat zones may be substituted by one, two, four, or any number of sections.

The oven as shown in FIG. 18, for example, has its upper segment 220 supported on stud-type columns 240 and 242 which in turn are mounted directly to supports as at 244, or to the stud-type column 246 that in turn is directed to the support 248. These supports extend to the floor as shown in FIG. 16. Likewise, the lower oven section 222 (FIG. 18) is mounted to the adjustable support 246 and stud-type column 250 which in turn are secured to the legs 248 and 244.

The oven has an upper zone 220 and a lower zone 222. Each has suitable heating means such as infrared bulbs directed upwardly and downwardly toward the web passage 224 therebetween. These heat sources are turned on and off in response to the controller and sensor units, to maintain a constant temperature. Since radiant heat sources such as electrical bulbs, when turned on and off, can cause highly fluctuating temperature variations on the web toward which they are directed, the web can easily be underheated or overheated in local areas. Also, since there are spaces between the bulbs, heat may be applied in some areas to a greater extent than others. To dampen such fluctuations and to moderate the heat over the area, a special heat buffer and moderator means is provided in this oven. This moderator means also serves to help prevent overheating of the web in case of web advancing equipment failure causing the web to be stopped in the oven. The moderator absorbs a substantial share of the heat and gradually dissipates it to the web. The moderator in its preferred form comprises a pair of mesh-type open, metal sheets 230 and 232 on the top and bottom respectively (FIG. 15) of the oven, each being between its respective heat supply source and the web passage. The open mesh work allows a considerable amount of radiant heat to be directly exerted through the mesh onto the web passing through the passage. The mesh work has a substantial metal area and volume so that a considerable amount of the radiant heat is absorbed by the metal and passes onto the sheet, largely by heating the air adjacent the sheet. Even though the infrared bulbs are constantly turned on and off in response to the temperature control network, the metal mesh dampens and moderates the heat applied. This causes substantially uniform heating of the web for optimum dependability.

In the oven, the web material is heated to a substantial temperature, for example around 220 degrees if the material is a polystyrene, foam-type web. The web softens considerably to be subject to forming. In so doing, however, it is weakened in its physical characteristics such as tensile strength. Also, if the web is the foam-type, it expands considerably in thickness when heated. In the novel apparatus, means is provided for retaining proper web advancing relationship even during this heating operation in the oven. This is all operably associated with the sheet advancing mechanism to be described.

WEB ADVANCING APPARATUS

Figure 9:
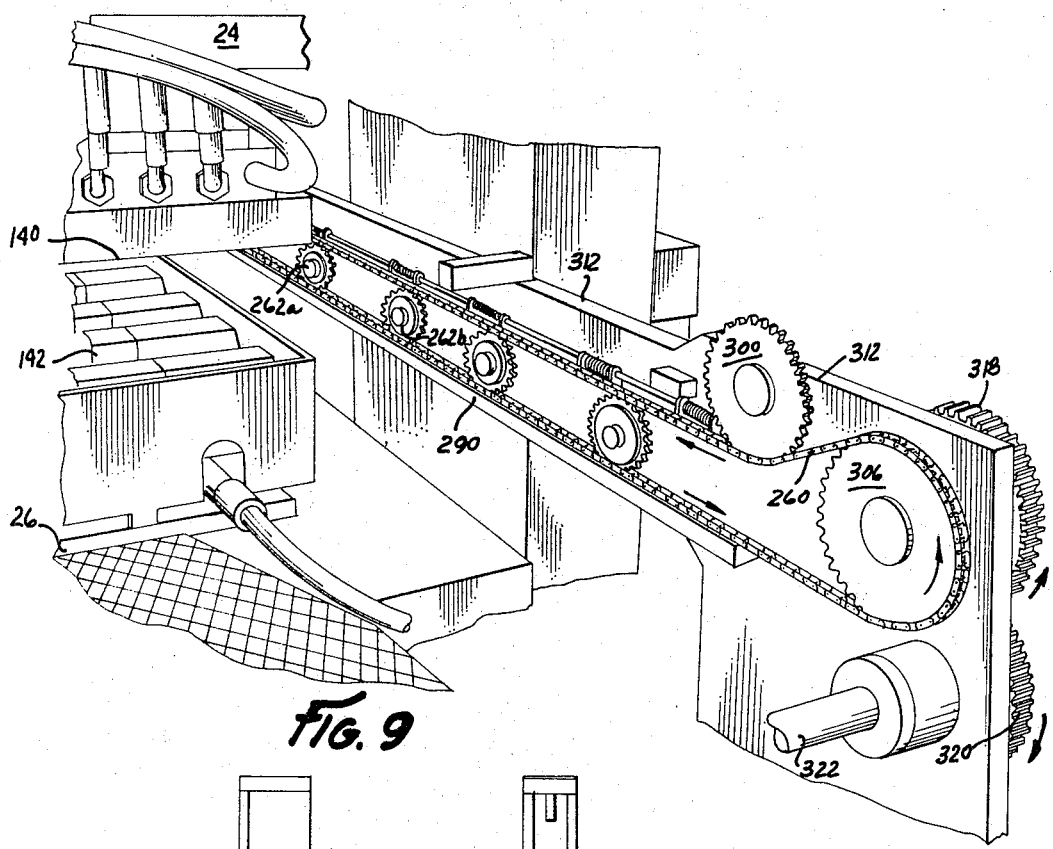
FIG. 9 is an enlarged, fragmentary, perspective view of one side of the discharge end of the forming press in FIG. 1, namely the side on the right-hand side of the apparatus in FIG. 1, showing part of the web advancing means adjacent the forming dies.
Figure 10:
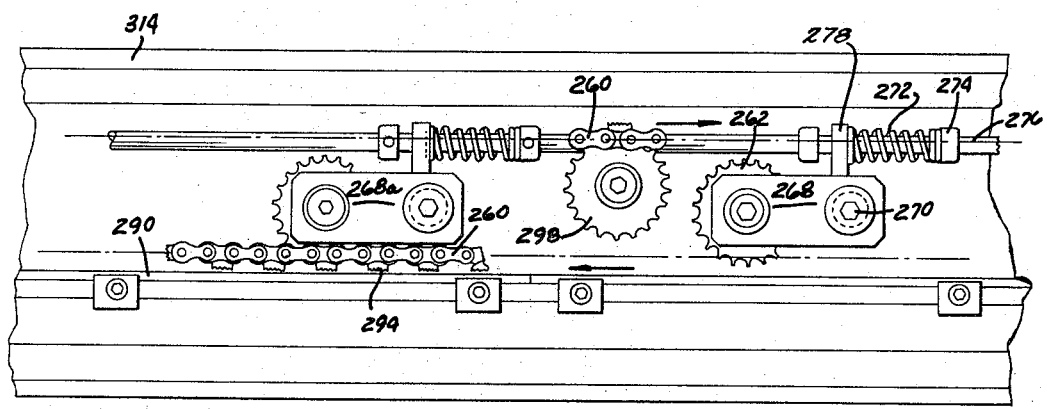
FIG. 10 is an enlarged, fragmentary, elevational view of a portion of the web advancing apparatus on the left-hand side of the press as viewed in FIG. 1.
Figure 11:
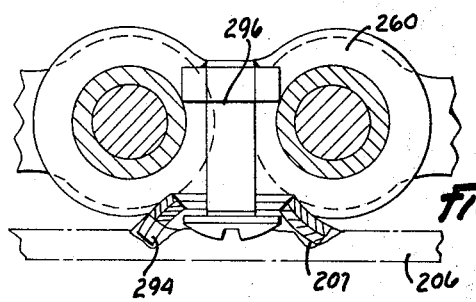
FIG. 11 is a greatly enlarged, fragmentary, elevational view of one small portion of the roller chain in FIG. 10.

The web advancing apparatus 16, noted with regard to FIG. 1, is a chain mechanism. It includes an assembly portion on each side of the oven and press, one portion shown in FIG. 9 for the right side of the press as in FIG. 1, and the other portion shown in FIGS. 10 and 11 for the left side. Each is a mirror image of the other. That is, on each side of the preheat tunnel, and astraddle the platens in the press, is an elongated chain means to grip one edge of the web and advance the web through the preheat oven and the press and discharge it on the discharge side of the press opposite the oven. Each of the elongated chains, one of which is shown at 260 in FIG. 9, extends the entire length of the oven and the press to advance the sheet intermittently and dependably. The chain on each side may be a single roller chain, similar to motocycle chain, i.e., made up of several roller links end-to-end. Preferably, however, it is a double roller chain assembly with the individual links integrally interconnected side-by-side as shown by the chain portions 260' and 260" in FIG. 21 as part of chain 260. That is, the links are not only interconnected pivotally, end-to-end, but are connected rigidly to each other side-by-side so that one chain section 260' can ride over a plurality of aligned sprockets 262, while the adjacent chain portion 260" rides on aligned biasing depressing wheels 264. Each sprocket and the adjacent wheel are both mounted coaxially on a rotation axis member 266 affixed to an individual pivot plate member 268 of the type shown in FIG. 10. An entire series of the spaced sprocket and wheel elements is mounted along each side of the apparatus as shown in FIG. 9 at 262a, 262b and the like. These are at reasonably spaced intervals as shown in FIGS. 9 and 10, with each sprocket and wheel unit being mounted on one of the rocker plates 268, 268a, etc., shown in FIG. 10. Each of the vertically shiftable plates is mounted on a horizontal, transverse pivot axis, e.g., 270, at its end opposite the attached sprocket so that it can be pivoted vertically in an arc to raise and lower the sprockets and wheel against the chains. This plate and its sprocket are biased downwardly by the action of individual coil compression springs 272 on rod 276. These springs each engage on one end against a respective fixed collar 274 affixed on the common rod 276. The other end of the springs engage an upwardly extending respective finger 278. Each finger has its lower end affixed to its respective plate 268. As can be noted, axial movement in a horizontal direction of the common adjustment rod 276 on which collars 274, etc., are mounted uniformly changes the compression of springs 272, etc., to vary the bias on plates 268, etc., and thus on the sprocket elements 262, etc., to vary the force applied against the chain 260. Axial movement of rod 276 varies all of these compression spring biasing values simultaneously and uniformly to cause a uniform compressive action on the chain all along its length. This is very significant for dependable web advancing.

Figure 12:
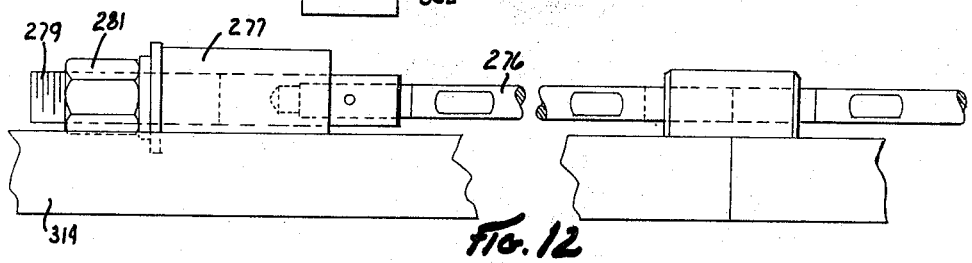
FIG. 12 is an enlarged, plan, fragmentary view of controlled biasing means forming part of the sheet advancing apparatus shown in FIG. 10.

The particular position of the common adjusting control rod 276 to control the bias of the several sprockets uniformly can be adjusted by using the apparatus in FIG. 12. More specifically, on the end of each of the rods 276 is a fixed collar 277 which receives the threaded end 279 of rod 276. A nut 281 threadably engages this end of the rod, and engages the fixed collar 277, so that, by rotation of nut 281, the axial position of the rod can be varied slightly to thereby uniformly vary the position of its several collars 274, etc., and the bias of compressing springs 272, etc. This collar 277 is affixed to the rigid side support of the apparatus, e.g., 314, to enable this adjustment to be made.

The chains are endless and recirculatory in character, each having a lower forward pass and an upper return pass, in the particular embodiment shown. The web is advanced by the chain portion in the lower pass. The lower pass as shown in FIG. 10, FIG. 9 and FIG. 21, is in a path of movement immediately adjacent an elongated fixed hard surface guide. This guide, more particularly, includes an elongated support plate 290 and an elongated hardened insert element 292 at the outer upper surface of the plate as shown in FIG. 21.

Chain 260 has toothed projecting portions protruding downwardly therefrom to contact the adjacent edge of the web and force it against the flat surface area forming a glide on this hardened plate insert so that, as the chain moves along this fixed glide plate, it advances the web in a controlled fashion. These projections are preferably in the form of a series of spaced star-shaped grippers 294 shown in exaggerated condition in FIG. 11. Each of the star grippers is generally annular in configuration, having a plurality of teeth which extend downwardly to project into the edge of the plastic web 206 (FIG. 11) and form small indentations 207 into the web to grip it. Each gripper may be an integral part of the chain link elements, may be riveted to the bottom of the link by suitable rivets, may be attached by small studs 296, or may be welded or otherwise suitably secured. In some instances, serrations may be formed directly in the adjacent link plates to form teeth. The uniformly adjusted plurality of biasing sprockets are adjusted with the apparatus in FIG. 12 to achieve exactly desired gripping action on the web, relative to its thickness. All portions of the chain grip uniform and dependable amounts so that advancement is neat, orderly, controlled, pre-set and variably controllable even during operation.

It has been found with actual operation that this type of arrangement achieves excellent control over the driving characteristics of the web, with distortion of the web being only minor, i.e., mere tiny indentations into the web edge. Squeezing compression on the edges is uniform along the entire length of the web so that the web does not tend to ripple and pull diagonally across it, or to wrinkle or distort in other undesirable fashions.

As shown in FIG. 10, the return path of chain 260 moves in an elevated position over the tops of sprockets 262, etc., and may even be supported by supplemental idler sprockets 298 for smooth return.

The chain is kept in controlled tautness as by idler sprocket 300 (FIG. 9) adjacent one end, and a second idler sprocket 302 (FIG. 15) adjacent the opposite end (shown in FIG. 15 on the second chain opposite to the one shown in FIG 9). Each of these chains passes around a major sprocket at each end of the assembly, illustrated for example by sprocket 306 at the discharge end of the press in FIG. 9, and by sprocket 308 at the entrance end of the oven in FIG. 15. These are mounted to the elongated support and enclosure side plate elements 312 (FIGS. 9 and 18) and 314 (FIGS. 15 and 18) on opposite sides of the oven.

Figure 13:
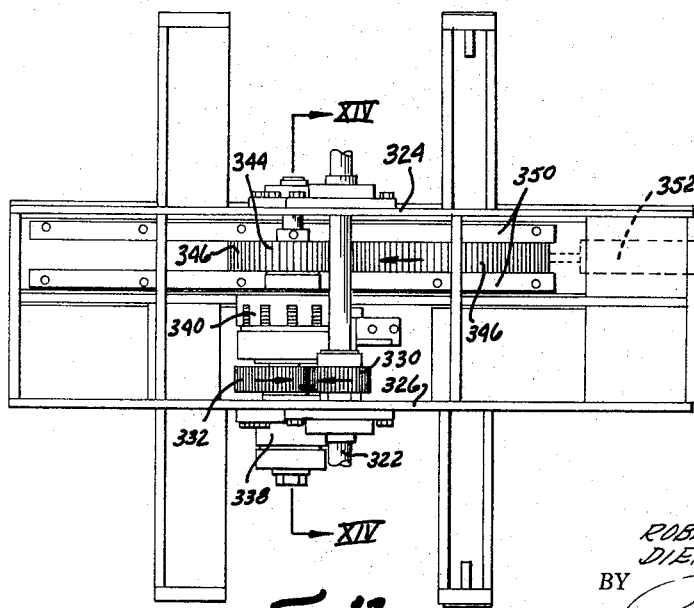
FIG. 13 is a plan view of the discharge portion of the press, taken from the direction XIII—XIII in FIG. 1, and showing the drive mechanism for operating the sheet advancing apparatus.
Figure 14:
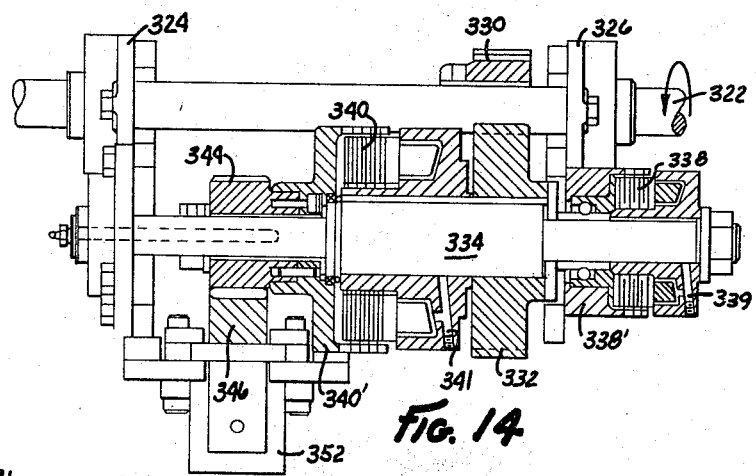
FIG. 14 is a sectional view of the apparatus in FIG. 13, taken on plane XIV—XIV in FIG. 13.

Coaxial with sprocket 306 (FIG. 9) and also rotatably mounted on support 312 is a driven spur gear 318. It is engaged with a driving gear 320 mounted on the end of drive axle 322. Drive axle 322 is rotatably suspended in bearing supports 324 and 326 (FIGS. 13 and 14). Mounted on drive axle 322 is another spur gear 330 engaged with spur gear 332 keyed to shaft 334 (FIG. 14). Also mounted on shaft 334 is a hydraulically operated brake 338 and a hydraulically operated clutch 340. Brake 338 has its housing 338' affixed to the frame of the assembly so that when the brake is engaged, shaft 334 is locked against rotation. The housing 340' of clutch 340, on the other hand, is connected to a spur gear 344 that engages an elongated gear rack 346. This gear rack is slidably retained between bearing slide mounts 350 (FIG. 13), and is operably connected to the output shaft of a fluid cylinder 352 which is designated in this device as an indexing cylinder. With extension of cylinder 352, rack 346 is extended to rotate spur gear 344 and thus, rotate shaft 334. When brake 338 is engaged, with retraction of the cylinder and gear rack, shaft 334 is locked against rotation and clutch 340 merely slips. When the gear and rack is moved forwardly and the hydraulic clutch is engaged, the hydraulic brake is always released so that movement of the spur gear 334 turns the clutch assembly, and thereby, turns spur gear 332, gear 330 and output drive shaft 322, to shift the chain type, web advance assembly a specific amount. This amount is set to cause one section to move into the forming dies while another section moves out of the forming dies. Both the clutch and the brake, mounted on the same shaft, are purposely operated from the same hydraulic control valve so that the clutch and brake are never simultaneously activated. Rather, they are always alternatively activated, as will be explained in detail with respect to the hydraulic control system in FIG. 8.

The use of these star grippers works excellently on foam type web stock to effect positive web advancement along the glide surface means. When the press is used on solid (unfoamed) web stock, however, it has been found preferable to employ the modified advancing means shown in FIGS. 23 and 24. The structures shown in these figures is essentially similar to that in FIGS. 21 and 11, except that portion 260″ of chain 260 has, in addition to grippers 294, intermittently spaced web puncture needles 295 mounted thereto. Each of these has an integral threaded screw stem 297 and a head, interfitted with a threaded sleeve 209 to secure it between the rollers and links of the roller chain.

These downwardly projecting pointed needles cooperate with a modified glide insert plate 292a. This glide member has a central elongated groove 293 along its length to receive the needles, and a pair of coplanar, flat, straddling shoulders forming slide surface area cooperative with the star grippers. This combination is found to effect excellent positive advancement of unfoamed plastic web stock without significant distortion of the web.

BASIC FLUID SYSTEM

This hydraulic control system is supplied from a suitable pressure fluid supply shown schematically at 400. The fluid is supplied through line 402 to any of the cylinders, i.e., for the upper platen cylinder, the lower platen cylinder, the index cylinder, and also to the brake and to the clutch. Fluid can be supplied through the single solenoid control valve C either to the brake or the clutch, alternatively, not both, through the valve assembly. This prevents any accidental partial shifting of the web when it is supposed to be stopped or supposed to shift a full section, to cause loss of registry, fouling of the equipment, distortion, etc. Loss of registry is particularly damaging if certain printed areas on the web lose registry with the forming dies. Advancement of the web is only under exactly controlled conditions, in intermittent fashion, for exact amounts, on a programmed basis.

Clutch 340 includes conventional clutch plates, housing components, and fluid inlet means 341. Brake 338 is very similar to the clutch, including friction plates, housing components, and fluid inlet means 339.

Fluid supply 400 also supplied the indexing cylinder 352 just mentioned, through a solenoid operated control valve D to actuate it for extension and retraction. Extension is simultaneous with clutch actuation to advance the web. Retraction is simultaneous with brake actuation to hold the web stationary with return (retraction) of the rack.

Figure 8:
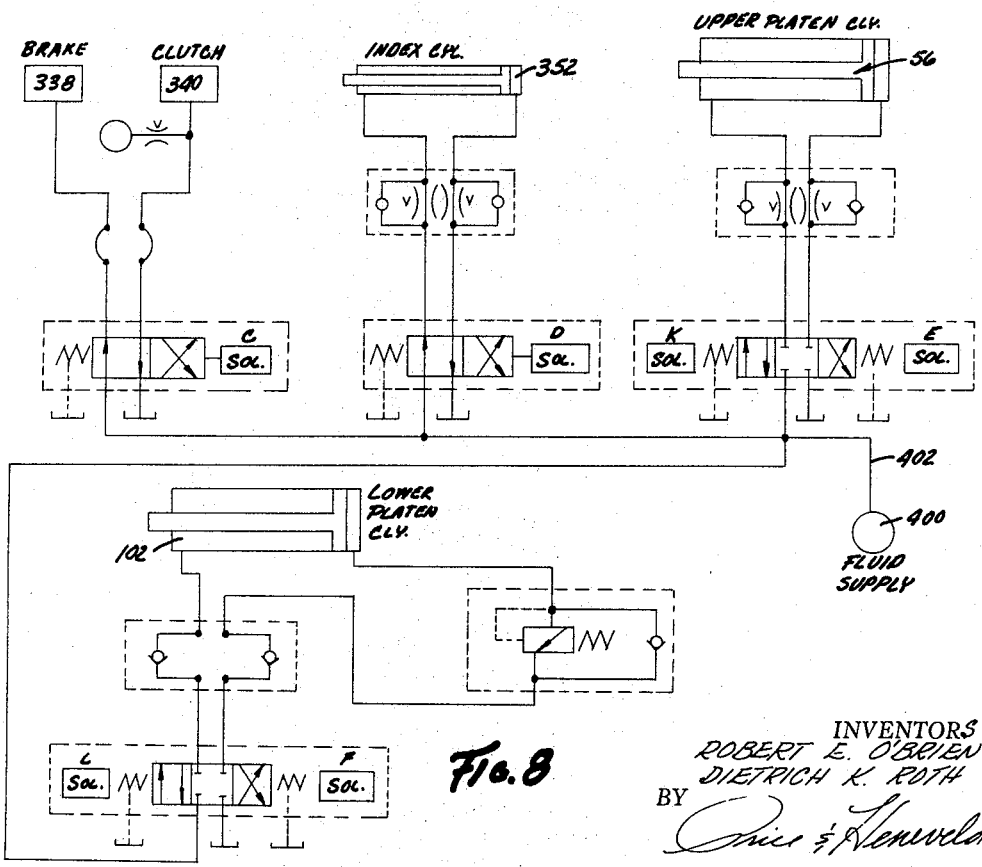
FIG. 8 is a fragmentary diagrammatic view of the main components of the hydraulic control and operating system for the apparatus.

Also, fluid is supplied to the upper platen cylinder assembly 56 shown schematically in a very simple form in FIG. 8, and to the lower platen cylinder 102. It is controlled through the respective solenoid operated valves E and K for upper platen cylinder means 56, and L and F for lower platen cylinder 102. The purpose for the double action valves in this instance will be explained hereinafter with respect to the electrical control system and the alternative methods of operating this universal press.

EDGE TUNNEL COOLING

Special cooling structure is provided along each edge of the tunnel as shown at 500 and 500′ in FIG. 18, and shown in enlarged form by FIG. 21 to assure proper advancing of the soft, weak, heated web. The advancing chains with their pluralities of sprockets are mounted in these cooling tunnels. The outer walls of the tunnels are formed by the supports 312 and 314 as shown in FIG. 21 for unit 500. These cooling tunnels extend the entire length of the oven to achieve controlled edge conditions on the web even though the central portion of the web is heated to several hundred degrees. Each tunnel also has inner, enclosing, vertical, elongated flanges 504 and 506 spaced from and parallel to support 312 to close off all of the tunnel area except for an elongated central slot 508 between them. These slots are oriented in coplanar fashion between the respective tunnels and the adjacent oven passage. Each slot is adjacent its chain 260 so that the web (shown in phantom in FIG. 21) 206 has its edges extending through the slots into the cooling tunnels. Each edge is gripped between the respective chain 260 and the hardened insert 292 of the flexed plate 290.

This tunnel is partially cooled by water heat transfer, and partially by pneumatic flow of cool air. More specifically, the top and bottom of each tunnel are enclosed by elongated water conduits 510 and 512. These have suitable inlet and outlet ports 514 and 516 for water passage. Supplementing the cooling action of these water ducts is a plurality of spaced air inlets along the length of the tunnel.

More specifically, referring to FIG. 21, one of the inlets is shown by the elbow connection 520 into the support enclosure plate 312, this elbow being connected to a cool air hose 522 for supplying cool air constantly through the outlet of the elbow and into the tunnel area. The air, directed generally inwardly toward the slot, divides as shown by the arrows in FIG. 21, to pass above and below the elongated plate 290, and thence over the chain and the edge of the web, through the outlet slot 508 and into the web passage. The air just bleeds slowly through these outlets under normal conditions so that, while it helps to maintain the edges of the web cool and sturdy, it does not cool the central portion web inside the oven passage. Its flow through the slots is just sufficient to prevent the heated air in the passage from flowing in the reverse direction to heat up the mechanism and web edges inside these cooling tunnels.

These cooling tunnel devices also have another function. That is, air inlet flow, although normally at a small slight bleed rate, is capable of achieving rapid cooling of the web in case of failure of the advancing equipment. If the advancing equipment fails in some manner and does not move the web in intermittent fashion according to the predetermined time intervals, a valve will open which will cause air to blast in through these plurality of spaced air inlets 520 along the length of the oven, to blow cool air at a high rate across the tunnels and through the slots into the main oven passage itself, to thereby cool the entire web even though it is held stationary in the hot oven. It will be realized that in case of failure, even though the heat source lamps are shut off, considerable residual heat remains in the oven which would cause overheating damage and possible combustion of the web.

OVEN TO PRESS TRANSFER

Another air control outlet portion of the apparatus is utilized to control the condition of the web between the outlet end of the oven and the inlet of the press. When deformation pressure is applied to the heated web inside the press to deform it, the drawing force applied to the heated softened web is very substantial. The chains grip the edges of the web in the oven very securely. But the deforming dies, particularly the matched dies as in FIG. 4, draw on the central portion of the web considerably at the stroke of the platens. This causes the web portion in the edge part 140′ and 142′ of the dies 140 and 142, immediately adjacent the oven, to tend to distort considerably. This causes the articles in this part of the die to be distorted and good only for scrap. It has been found that control of the web in this area is important to eliminate this defect which otherwise occurs with the stroke of the press. Preferably, this control of the web is achieved by controlling the characteristics of the web in this area, to prevent portions of the web from being stretched longitudinally between the heating oven and the dies. Referring to FIG. 20, at the end of the oven immediately adjacent press 12 is an elongated, transverse cool air manifold 550, and an adjacent transverse air baffle 552. Referring to FIG. 17, this combination of elements is shown in more detail, looking generally at the underside with respect to an imaginary web 206 shown in phantom as passing beneath these elements. The manifold 550 comprises an elongated tube, for example, with a plurality of adjacent spaced outlet air orifices 554 (or alternatively a slit) along its underside, directed toward web portion immediately therebeneath. Behind this manifold, i.e., between it and the outlet end of the oven, is baffle 552 which is suspended on suitable supports 556 at the end of the oven. This baffle prevents cold air from being blown back into the oven. Another baffle may be employed on the other side of the manifold, but normally is not found necessary.

The manifold is supplied by cool air through a suitable air inlet duct 560. It directs cool air at the web only at controlled intervals, when necessary, and does not blow out cold air constantly. The web, heated in the oven and advanced into the press in intermittent fashion, is not cooled while moving beneath this manifold, but only after the web section which is to be die formed is moved into the press and the web has stopped. Then this air manifold blows cool air on a narrow strip of web transverse to its longitudinal dimension, between the oven and the press. This strengthens the web in this transfer zone, by cooling it. Thus, the preheated web in the press can be properly formed in its softened condition since a narrow zone a couple of inches wide across the web is cooled and strong, to prevent excessive drawing action along the length of the web when the die elements deform it. The deformation is limited to the specific zone of the web between the dies, rather than extending therebeyond.

Conceivably, this air cooling function could be supplemented by, or substituted by, a mechanical gripping means such as that shown in FIG. 22. The web is controlled in this less preferred instance by gripping the small transverse transfer section thereof by a pair of cooperative intermeshing elements 143 and 145 attached to the upper and lower platens adjacent the dies used, e.g., 140 and 142. These meet with closing of the dies to squeeze and grip this transfer zone portion of the web momentarily between their interengaging rib and groove while the forming operation occurs. Such a squeezing means could be cooled and/or simply a pair of interfitting corrugated elements, located where the air manifold is, to grip this section of the web while it is being formed.

CIRCUIT DIAGRAM AND OPERATION SEQUENCE VARIATIONS

Figure 7A:
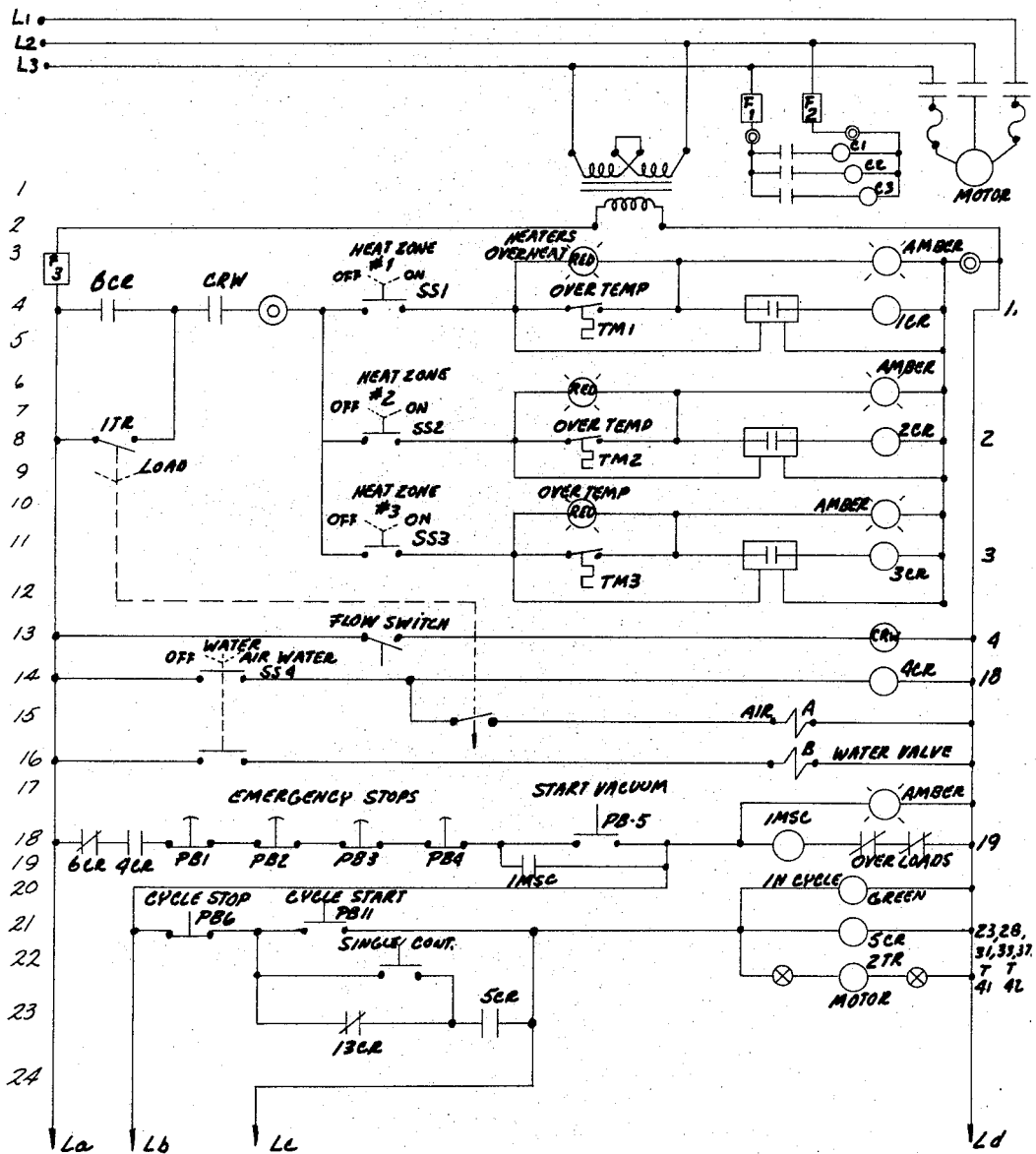
FIG. 7A is a diagrammatic view of the first portion of the electrical circuit diagram of the control system for the apparatus.
Figure 7B:
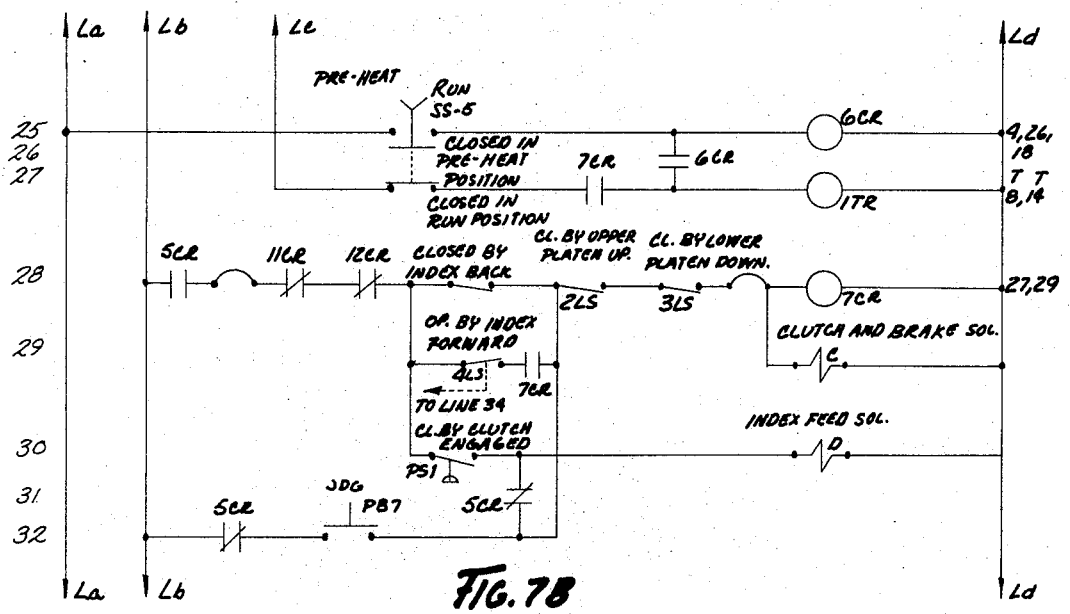
FIG. 7B is a diagrammatic view of a second portion of the circuit diagram forming an integral part of the circuit in FIGS. 7A and 7C.
Figure 7C:
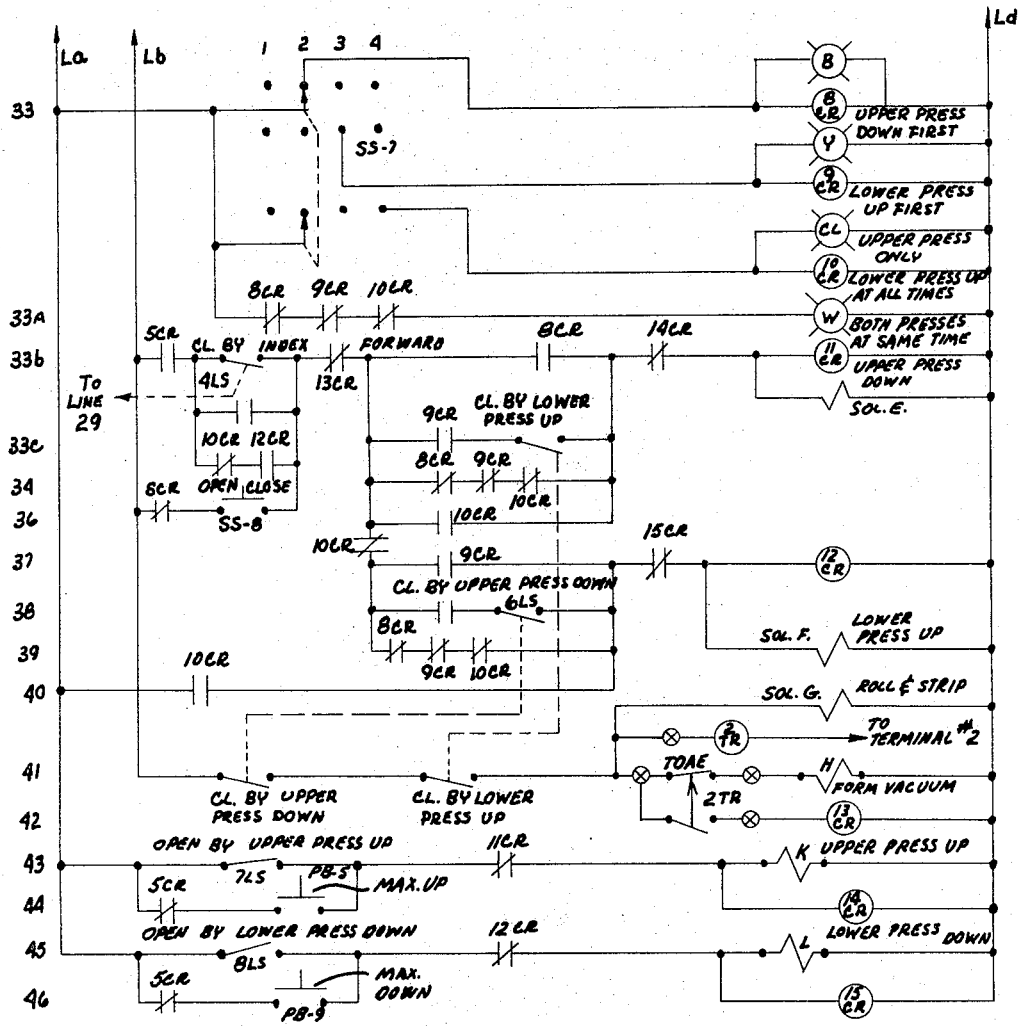
FIG. 7C is a diagrammatic view of a third portion of the circuit diagram in FIGS. 7A and 7B.

The operation of the apparatus can be understood best, in alternative forms, from studying the following outlined sequence of operations, with reference to the circuit diagram shown in FIGS. 7a, 7b, and 7c. FIG. 7b is actually a continuation of FIG. 7a and should be placed immediately therebelow with leads La, Lb, Lc, and Ld aligned and likewise FIG. 7c is a continuation of FIG. 7b and should be placed below it with leads La–d aligned. In this circuit diagram, the designations noted have the following meanings: F means fuse; C means contactor; Trans. means transformer; Cr means relay or relay contact; SS means selector switch, PB means pushbutton; and TR means timer; the remaining abbreviations and wording is believed to be self-explanatory.

One having ordinary skill in the art will understand the operations from the following outlined.

SEQUENCE OF OPERATIONS FOR MODIFIED BOTTOM DELIVERY PRESS INCLUDING HEAT TUNNEL

A. Preheat heat tunnel (1) Turn SS–4 to position "water" energizing water valve Sol. B.

(2) Flow switch closes energizing relay CRW to close contact CRW in Line 4.

(3) Turn SS–5 to position "preheat" energizing relay 6CR.

(4) Contacts 6CR in Line 4 and Line 26 close, contact 6CR in Line 18 opens.

(5) Contact 6CR in Line 4 closed will supply control power to temperature control units if SS–1, SS–2 and SS–3 are in "on" position. This will energize heating elements to preheat tunnel.

(6) Contact 6CR in Line 26 closed energizes time relay ITR to by-pass air blow safety circuit.

(7) Contact 6CR in Line 18 opened will prevent form press operation in preheat condition. In this condition the heat tunnel will heat up to the desired temperature and maintain it.

B. Automatic form press cycle (1) Turn on hydraulic unit.

(2) Turn SS–4 in "air-water" position, energizing relay 4CR to close contact 4CR in Line 18. This will assure that safety air blow circuit is energized before press operation.

(3) Turn SS–5 in "run" position, de-energizing relay 6CR and time relay ITR.

*Note.*—Time Relay ITR starts to time and if form cycle has not been started before ITR times out, the safety air blow circuit will function. At this time, contact ITR in Line 8 opens, de-energizing the heat tunnel control and ITR contact in Line 14 closes, energizing Sol. A to blow air. The time delay of ITR relay should be adjusted to approximately two times the form press cycle time.

(4) Depress PB–5 to start vacuum unit. Contact 1 MSC closes in Line 19 to supply control power to wire #24.

(5) Turn SS–6 in "continuous" position and depress PB–11 energizing relay 5CR to start cycle. Relay 5CR seals itself through SS–6 and contact 5CR in Line 23.

(6) Relay 11CR and 12CR de-energized and limit switches 1LS, 2LS, and 3LS closed energize relay 7CR and Sol. C to engage clutch and disengage brake. Relay 7CR seals itself thru 4LS and contact 7CR in Line 29.

(7) Clutch engaged closes PS1 energizing Sol. D to extend index cylinder.

(8) Index cylinder extended opens 4LS de-energizing relay 7CR and Sol. C to disengage clutch and set the brake.

(9) Clutch disengaged, opens PS–1 de-energizing Sol. D to retract index cylinder.

(10) Selector switch setting SS–7 determines the sequence of the upper and lower press.

(A1) SS–7 in "1" position upper and lower press cylinder actuate simultaneously. Relay 8, 9 and 10CR de-energized.

(A2) Index cylinder extended, closes 4LS and contacts 8CR, 9CR and 10CR in Lines 34 and 29 closed energize relay 11CR Sol. E to extend upper press cylinder and relay 12CR Sol. F to extend lower press cylinder.

(B1) SS–7 in "2" position extends upper press cylinder first. Relay 8CR energized—relay 9CR and 10CR de-energized.

(B2) Index cylinder extended closes 4LS and contact 8CR in Line 33B closed, energize relay 11CR and Sol. E to extend upper press cylinder.

(B3) Upper press cylinder extended, closes 6LS energizing 12CR Sol. F to extend lower press cylinder.

(C1) SS–7 in "3" position extends lower press cylinder first. Relay 9CR energized—relay 8CR and 10CR de-energized.

(C2) Index cylinder extended closes 4LS, and contact 9CR in Line 37 closed, energize relay 12CR Sol. F to extend lower press cylinder.

(C3) Lower press cylinder extended, closes 5LS energizing 11CR Sol. E to extend upper press cylinder.

(D1) SS–7 in "4" position locks lower press cylinder in extended position and sequences the upper press cylinder only. Relay 10CR energized—relay 8CR and 9CR de-energized.

(D2) Relay 12CR Sol. F is continuously energized by contact 10CR in Line 40, keeping the lower press cylinder extended.

(D3) Index cylinder extended closes 4LS and contact 10CR in Line 36 closed, energize relay 11CR Sol. E to extend upper press cylinder.

(11) Upper press cylinder extended, closes 6LS and lower press cylinder extended closes 5LS energizing timer 2TR, Sol. G to strip material and Sol. H to open vacuum valve.

(12) Timer 2TR times out opening contact 2TR in Line 41 and closing 2TR contact in Line 42.

(13) Contact 2TR in Line 41 opened, de-energizes Sol. H to close vacuum valve.

(14) Contact 2TR in Line 42 closed energizes relay 13CR to open contact 13CR in Line 33B.

(15) Contact 13CR in Line 33B opened, de-energizes relays 11CR and 12CR (SS–7 position "1," "2" and "3" only). In SS–7 position "4" relay 11CR is de-energized only.

(16) Contact 11CR in Line 43 closed energizes relay 14CR and Sol. K to retract upper press cylinder.

(17) Contact 12CR in Line 45 closed, energizes relay 15CR and Sol. L to retract lower press cylinder. This completes one cycle of the form press. If selector switch SS–6 was placed in "single" relay 5CR is de-energized at the end of the cycle by the opening of contact 13CR in Line 23. Therefore, a recycling has to be initiated by depressing PB–11.

It will be realized from the detailed description given above that there are several inventions involved in this unique apparatus. Since all of these are best understood in the context and in combination with the components with which they are found, the entire description is given herein.

It will also be obvious to those having ordinary skill in this art that the apparatus described has several unique functions, and achieves a control over the preheating forming and advancing of the web which has not been possible heretofore. Even materials such as foam-type web can be handled and operated upon dependably for hours upon hours in an automated, high production manner. This has been proven by experimental use. By simple manipulations of the novel apparatus, the press can be converted to operate on materials which need substantial preheating, or on relatively thin webbing which can be heated practically instantly to be formed by pressure differential techniques. There is accuracy of platen movement to achieve this pressure differential action, even when using a knife edge type sealing and creasing action which necessitates control of the knife edge and platens within a few thousandths of an inch. There is substantial flexibility and relatively large stroke capacity to achieve mechanical forming action, rapidly, with matching dies with or without pressure differential assist. Any dies can be substituted on the upper and lower platens by any conventional clamping means or bolting action so that the press is adaptable readily and in a matter of minutes to do one type of operation or another. Its upper and lower platens can be adjusted to specific positions for exactly controlled operation thereof, simultaneously with the double stroke action, or alternatively.

The lower platen can be locked in position for movement only of the upper platen. In such a case, the lower platen has complete rigidity and stability, capable of holding its particular lower position even when substantial force is applied. This takes the place of the old type in which the lower platen was a very heavy bed to achieve stability.

Various additional advantages and minor modifications of the apparatus will occur to those in the art upon studying the foregoing detailed description. Various detailed changes in construction can be made to suit particular types of surroundings, particular types of forming dies and techniques, particular types of plastics and sheet thicknesses to be handled, and other related factors. The invention is intended to be limited only by the scope of the appended claims and the reasonably equivalent structures and methods to those defined therein.

We claim:

1. A forming press having capacity for different type forming operations comprising: platen support means including a rigid support frame having a pair of spaced uprights with a top cross beam therebetween and a base; upper platen means and lower platen means between said uprights for forming materials therebetween; shiftable means suspending said upper platen means beneath said cross beam, and shiftable means to shift it vertically toward and away from said lower platen means; means supporting the lower platen above said base, and shiftable means to shift said lower platen means toward and away from said upper platen means, whereby the platen means can be shifted together and apart; platen locking means between said lower platen means and said platen support means, operably lockable to securely lock said lower platen means in one fixed position to cause it to comprise a rigid platform for forming operations by movement only of said upper platen means; control means operably associated with both said shiftable means, and including means to cause operation of both said shiftable means, and alternatively, to cause operation of only said upper platen shiftable means.

2. A forming press having a capacity for different type forming operations, comprising: a support framework; an upper platen suspended on said framework and having powered shifting means for vertically shifting said upper platen; a lower platen supported on said framework; vertical guideways engaging said lower platen; a toggle linkage beneath said lower platen between it and said framework to raise said lower platen when extended; powered extension means operably engaged between said toggle linkage and said framework to extend and contract said linkage for raising and lowering said lower platen; cooperative platen locking elements on the central portion of said linkage and the adjacent portion of said framework, operably engageable when said linkage is extended, to lock said lower platen in its raised position with said linkage extended therebeneath in supporting condition.

3. A forming press comprising: support means including a pair of spaced uprights with a top cross beam and a bottom base; an upper platen beneath said cross beam between said uprights; a first toggle linkage suspending said upper platen on said support means; and first powered fluid cylinder extension means operably engaged to said toggle linkage to contract and extend it for respectively raising and lowering said upper platen; a lower platen above said base and between said uprights; a second toggle linkage supporting said lower platen on said support means, and powered fluid cylinder extension means operably engaged to said second linkage to contract and extend it for respectively lowering and raising said lower platen; control means operably associated with both said fluid cylinder means, to alternatively operate both of said cylinder means, and said first powered fluid cylinder means only; and interlockable elements on the central portion of said second toggle linkage and the adjacent portion of said support means to lock said lower platen in its raised position with operation of only said first cylinder means.

4. A forming press comprising: support means including a pair of spaced uprights with a top cross beam and a bottom base; an upper platen beneath said cross beam between said uprights; a first toggle linkage suspending said upper platen on said support means; and first powered fluid cylinder extension means operably engaged to said toggle linkage to contract and extend it for respectively raising and lowering said upper platen; a lower platen above said base and between said uprights; a second toggle linkage supporting said lower platen on said support means, and powered fluid cylinder extension means operably engaged to said second linkage to contract and extend it for respectively lowering and raising said lower platen; control means operably associated with both said fluid cylinder means, to alternatively operate both of said cylinder means, and one of said fluid cylinder means only; and interlockable elements on the central portion of the toggle linkage with which the other cylinder means is associated, and on the adjacent portion of said support means to lock the platen operated by said other cylinder means by locking its toggle linkage in extended position.

References Cited

UNITED STATES PATENTS

| | | | |
|---|---|---|---|
| 2,582,891 | 1/1952 | Strauss | 18—2 XR |
| 2,828,507 | 4/1958 | Strauss | 18—2 XR |
| 2,837,765 | 6/1958 | Harvey | 18—16 |
| 3,040,378 | 6/1962 | Rodgers et al. | 18—2 XR |
| 3,195,186 | 7/1965 | Gaubon et al. | 18—30 XR |

J. SPENCER OVERHOLSER, *Primary Examiner.*

HOWARD J. FLINT, JR., *Examiner.*